UNITED STATES PATENT OFFICE.

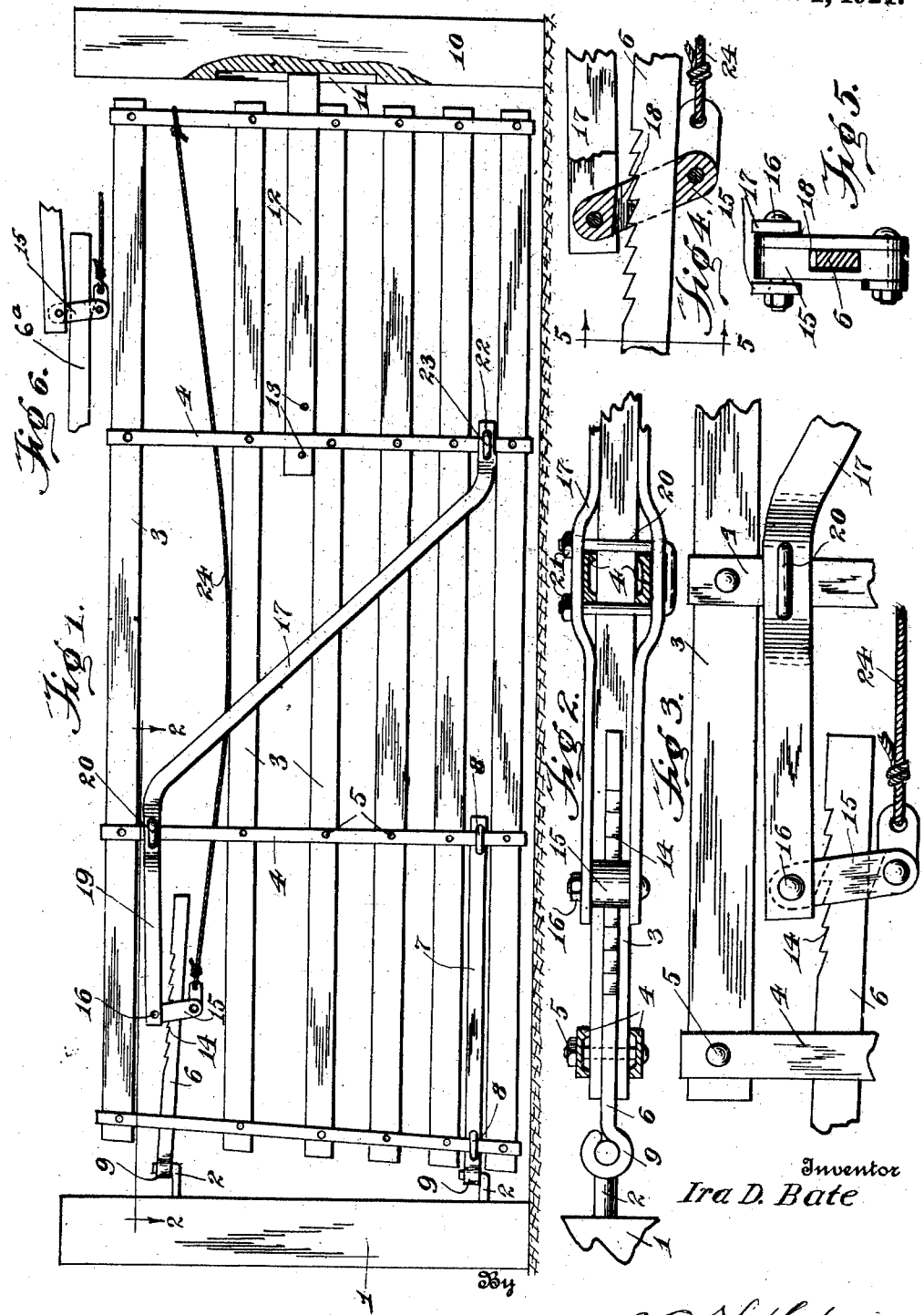

IRA D. BATE, OF WEST JEFFERSON, OHIO.

FARM-GATE.

1,367,226. Specification of Letters Patent. Patented Feb. 1, 1921.

Application filed July 22, 1919. Serial No. 312,527.

*To all whom it may concern:*

Be it known that I, IRA D. BATE, a citizen of the United States, residing at West Jefferson, in the county of Madison and State of Ohio, have invented certain new and useful Improvements in Farm-Gates, of which the following is a specification.

This invention relates specifically to farm gates, and is particularly directed to an improved gate structure wherein is embodied a correlation of bracing elements which effectively serve to prevent a gate from sagging or twisting laterally, and on the other hand provides a structure which will be capable of maintaining its proper form so that free swinging movements may be imparted to the same.

Another object of the invention resides in a gate wherein the front end of the same may be elevated to a considerable extent and to thus permit small stock or the like to pass thereunder while the full grown or larger stock is prevented from passing therethrough.

Another important object of the invention resides in improved means for effecting the swinging support of the gate structure, said means consisting of a hinge bar having pivotal connection with a rigid support and the frame work of said gate structure being adjustably connected with said bar whereby the height of the gate relative to said support may be regulated.

A further object of the invention resides in the provision of an improved catch member between the bar and the frame work, said catch member being designed to engage with any one of a plurality of notches formed in said bar, in order that when the catch member is released from said bar said gate may be adjusted vertically, a cable being connected with said catch member so as to effect its release from said bar at a point remote from the latter.

A still further object resides in the provision of a gate structure wherein is embodied a plurality of longitudinally extending bars which are rigidly united in horizontally spaced relation by means of vertically extending rails, the latter being appropriately spaced throughout the length of the gate so that the latter will be substantially divided into three sections, and an improved brace structure being situated to connect the intermediate rails of the gate, said brace structure extending in a diagonal direction and effectively serves to prevent twisting or lateral sagging of the gate.

For a further understanding of the invention reference is to be had to the following description and to the accompanying drawing, in which:

Figure 1 is a side elevation of a gate constructed in accordance with the principles of the invention, Fig. 2 is a sectional view taken along the line 2—2 of Fig. 1, Fig. 3 is a fragmentary elevation of a structure for effecting the pivotal support and vertical adjustment of the gate, Fig. 4 is a detail view disclosing the pivoted catch member, and illustrating the latter out of engagement with a notched bar member, Fig. 5 is a sectional view taken along the line 5—5 of Fig. 4, and Fig. 6 is a detail view setting forth a slightly modified form of the invention.

Referring more particularly to the details of the invention, the end post to which the gate is hingedly mounted is designated by the numeral 1, and this post carries a pair of vertically spaced and rigid pintles 2. The gate itself is formed of a plurality of longitudinally extending bars 3, which are held in their assembled relation by means of a plurality of vertically arranged rails 4. These vertical rails are preferably of channel shape and are arranged in pairs so as to clamp the bars between them by means of the transverse bolts 5. It will be observed that these bolts pass directly through the rails and bars so that the rail members may be drawn into holding engagement with the bars, the edges of said rails impinge against the bars and in this manner the main body portions of said rails are spaced from the bars in order to prevent decay in the latter. Also, by passing the bolts 5 through the bars and rails in the manner stated the gate as a whole will be capable of being rocked vertically a limited distance, and the invention further provides means for retaining the gate in any of its vertically adjusted positions so that the latter may be adjusted to assume any desired height of operation.

To this end, the upper pintle 2 is equipped with a pivoted bar member 6 which is capable of being securely connected to the upper frame work of the gate, and the lower end of said gate is provided with a second rigid bar member 7. The member 7 is rigidly secured to the lower ends of certain of the rails 4 by means of U bolts 8, and both of the members 6 and 7 are provided with eyes 9 which are adapted to engage with the vertical portions of the pintles 2 so that the swinging support of the gate may be effected. It will be observed that the inner hinged end of the gate is formed on a bias relative to the post 1, and by being thus formed the gate may be rocked vertically with respect to said post and proper clearance will be maintained between parts. A second post 10 is provided at the free swinging end of the gate, and this post may be formed with a vertical recess 11. This recess is adapted to receive the end of a slidably mounted locking bar 12, the latter being supported upon one of the bars 3 and is guided between the spaced rails 4, pins 13 project from the bar 12 and by engaging with one of said rails the sliding movement of the bar will be controlled. By inserting the end of the bar 12 into the recess 11 the gate may be locked in its closed position, and when the bar is removed from the recess the swinging movements of the gate may be readily effected.

In order to securely brace the gate against lateral twisting strains, to effect its pivotal support and to permit the gate to be vertically adjusted so as to assume various working heights, the bar member 6 is provided on its upper surface with a plurality of inclined notches 14, and disposed to engage with any one of these notches is a pivoted catch member 15. This catch member is pivoted as at 16 between the ends of a pair of parallel extending brace members 17 which are disposed on opposite sides of the gate, and said catch member is formed with a slot 18 capable of receiving the bar member 6. The upper wall of the slot 18 is preferably cut on an angle, so that when the catch member occupies a substantially vertical position said upper wall will engage with one of the notches 14 and in this manner the ends of the brace members 17 will be united with the bar member 6, so that said brace members will pull directly upon the upper pintle 2, the weight of the gate serves to maintain the contact between the upper wall of the slot 18 and the notch 14 in which it is situated. The brace members 17 include horizontal upper portions 19 which extend parallel and meet adjacent to the uppermost of the bars 3, and the portions 19 are secured to one of the vertical rails 4 by means of a U shaped bolt 20, clearly shown in Fig. 2. Nuts 21 are carried by the threaded ends of the bolt 20 and serve to rigidly clamp the brace members 17 in secured relation with said rail. After being secured to one of the rails of the gate by means of the bolt 20, said brace members extend diagonally downward and terminate adjacent to the lower edge of the gate in offset extremities 22. These extremities are secured to one of the intermediate rails by means of a second U shaped bolt 23. It will thus be manifest that the swinging suspension of the gate is effected over the full width thereof, beginning at the lower edge of the gate and terminating at the upper hinged corner thereof. In this manner the strain incident to the hinge support of the gate is distributed over substantially the entire frame work thereof so that no single portion thereof will be subjected to undue stress. Also, by extending the brace members 17 diagonally through the medial portion of the gate lateral twisting movement on part of the latter is substantially overcome, thus providing a structure which will brace the gate laterally as well as vertically.

Quite frequently in gate operation it is desirable that the height of the gate be lowered, and to effect this in a very convenient manner, the present invention provides the lower end of the catch member 15 with a flexible cable 24, and this cable extends to a position adjacent to the free swinging end of the gate. By merely pulling upon the cable 24, the catch member 15 will be oscillated, as shown in Fig. 4, so that the upper wall of the slot 18 will be freed from engagement with one of the notches 14, thus disconnecting the gate from its supported engagement with the bar member 6. Obviously, when thus disconnected the gate will be enabled to drop downwardly, and when the proper height has been reached the cable 24 is released so that the catch member will return by gravity into engagement with one of the notches 14, thus again locking the brace members 17 with the bar member 6 so that the gate will be supported for its swinging movement.

From the foregoing description taken in connection with the accompanying drawing, it will be apparent that there is provided a gate wherein is embodied improved features of construction for effecting its pivotal support, and that mechanism is provided which will enable the gate adjusting elements to be operated from a remote position. When it is desired to elevate the gate, the free swinging end of the latter is merely grasped and elevated bodily, this causes the catch member to ride over the notched face of the bar member 6 until the proper height has been reached, and then by releasing the gate, said catch member will drop into one of the notches and the support of the gate thereby be effected. Then, on the other hand, to lower the gate the latter is slightly elevated so that the catch member will clear the notches 14. The catch member is then held out of engagement with the notches by drawing upon the cable 24, this permits the gate to be lowered until the proper height has been reached, whereupon the cable is released so that the catch member may fall by gravity into locking coöperation with the notches of the member 6. By extending the brace members 17 diagonally through the intermediate portion of the gate and by connecting its ends with adjoining rails 4 twisting movement of the central portion of the gate will be obviated and in this manner its rigidity will be established. Moreover, by connecting the lower ends of the brace members 17 with the lower edge of the gate, the stress upon the upper pintle 2 will begin from the lower edge of the gate and will extend over the width of the latter, in this manner the gate will be supported at its outer end from its lower edge so that its free swinging movement will be enhanced.

As shown in Fig. 6, a structure is provided wherein the bar 6ª is of plain formation, or in other words the notches 14 are eliminated. Obviously, owing to the angularity of the gripping faces of the holding link or member 15 the use of such notches is not strictly necessary to effect the support of the gate in any desired position. However, the notches 14 are employed in the preferred form of the invention merely to render the operation and use of the catch member 15 reliable and positive.

What I claim is:

1. In a farm gate, a plurality of longitudinally extending bars, vertically disposed rails arranged at intervals throughout the length of said gate and serving to unite said bars, a brace structure disposed to extend diagonally of said gate and having its lower end connected with the lower portion of one of said rails and its upper end connected with the upper portion of an adjacent rail, said brace structure being upwardly terminated in a substantially horizontally disposed projecting end, a bar formed to be pivotally connected with a gate support, and a catch member pivotally carried by the projecting end of said brace structure and arranged to be secured to said bar to connect the gate with said support for swinging movement and for substantially vertical adjustment.

2. In a farm gate, a plurality of longitudinally extending bars, spaced vertical rails arranged to connect said bars, a brace structure for said gate arranged to extend diagonally between a pair of said rails and fixedly connected thereto, said brace structure being formed to include a longitudinally extending projecting end arranged to lie between a pair of said rails and connected thereto, a gate support, a bar pivotally connected with said support and having teeth provided in one of the longitudinal edges thereof, and a catch member pivotally carried by the free end of the projecting end of said brace structure and arranged to be engaged with said teeth to pivotally unite said gate with said support and to permit of the substantially vertical adjustment thereof.

In testimony whereof I affix my signature.

IRA D. BATE.